No. 887,950. PATENTED MAY 19, 1908.
A. G. LINDENBORG.
PROCESS OF MAKING SEAMLESS HOLLOW WARE.
APPLICATION FILED SEPT. 12, 1906.

2 SHEETS—SHEET 1.

WITNESSES:
Frank G. Parker
John Buckler

INVENTOR:
August Gerhard Lindenborg
by Donald Campbell
his attorney

No. 887,950. PATENTED MAY 19, 1908.
A. G. LINDENBORG.
PROCESS OF MAKING SEAMLESS HOLLOW WARE.
APPLICATION FILED SEPT. 12, 1906.

2 SHEETS—SHEET 2.

WITNESSES=
Frank G. Parker
John Buckler

INVENTOR=
August Gerhard Lindenborg
by Donald Campbell
his Attorney

UNITED STATES PATENT OFFICE.

AUGUST GERHARD LINDENBORG, OF TAUNTON, MASSACHUSETTS, ASSIGNOR TO REED AND BARTON CORPORATION, A CORPORATION OF MASSACHUSETTS.

PROCESS OF MAKING SEAMLESS HOLLOW WARE.

No. 887,950.  Specification of Letters Patent.  Patented May 19, 1908.

Application filed September 12, 1906. Serial No. 334,207.

*To all whom it may concern:*

Be it known that I, AUGUST GERHARD LINDENBORG, a subject of the King of Sweden, and resident of Taunton, Massachusetts, have invented a new and useful Improvement in the Process of Making Seamless Hollow Ware, of which the following, taken in connection with the accompanying drawings, is a specification.

My invention relates to an improved process or method for manufacturing seamless hollow ware, and more particularly seamless pitcher-shaped vessels; and the novel product of said process or method.

An object of my invention is to produce from a hollow metallic blank of a generally cylindrical form, a vessel having a contracted neck portion suitable for use in the manufacture of pitchers and other similar hollow ware articles.

Heretofore in the manufacture of pitchers or other vessels having an enlarged section below a contracted neck it has been common to produce the two vertical halves of the article and after which secure them together along a seam where the edges of the two metallic parts unite. Other methods have been used without satisfaction.

My invention provides a novel method which accomplishes a novel result, namely: the manufacture of a product which is a pitcher-shaped vessel or the like without seams and in which the original sheet metal is maintained fully of its original thickness.

I will first describe one method or process embodying my invention and also a machine for carrying out that process or method, and will then point out the novel features in the claims.

Figure 1:
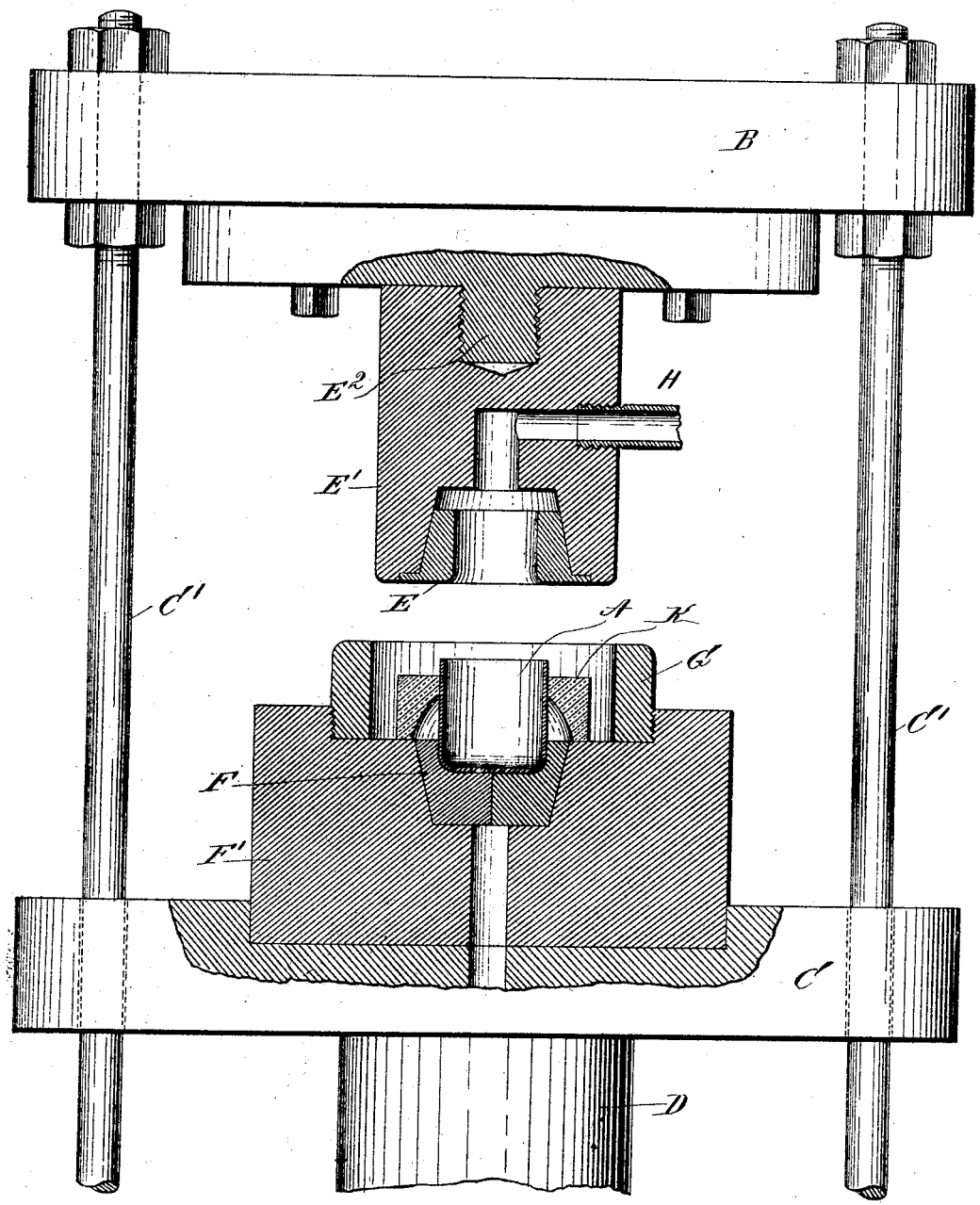
Figure 2:
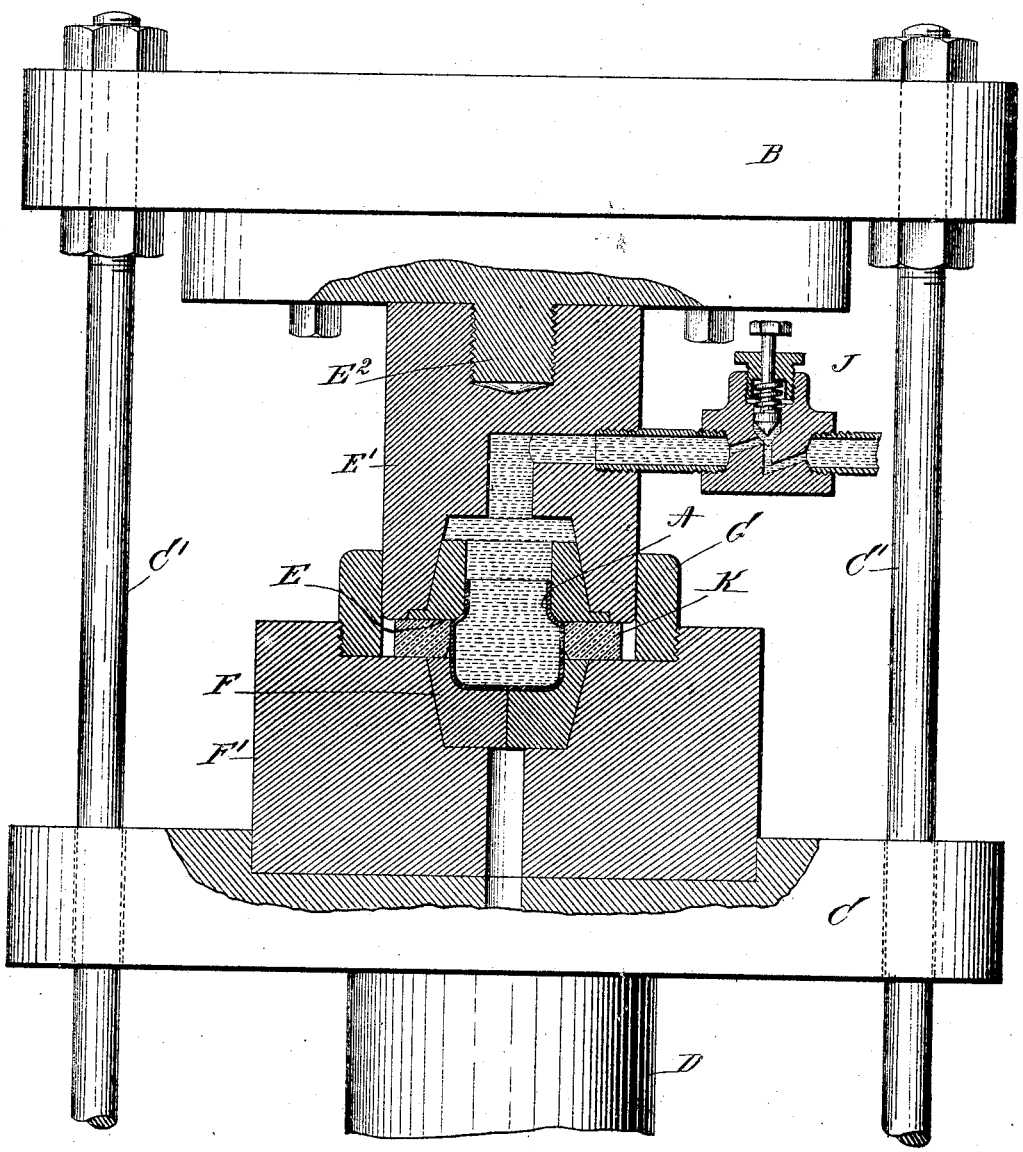

In the accompanying drawings Figure 1 is a sectional view of a machine for carrying out my novel method or process with a cupped-up blank inserted in place before the application of my novel process or method. Fig. 2 is a similar sectional view showing the blank formed with a contracted neck portion in the manner of my novel process or method.

Similar letters of reference designate corresponding parts in the several figures of the drawing.

The description of the novel method or process embodying my invention will naturally begin with the cupped-up blank or cup-shaped blank which is a well known article. This blank is shown at A in Fig. 1. It has a bottom and cylindrical sides, but of course the outline of the cylinder may be of any desired contour such as an oval, a circle or even an irregular outline.

In carrying out my novel process of making seamless hollow ware such a cupped-up blank is taken and placed between a lower or supporting die and an upper or contracting die, and after filling the blank and the contracting die with the liquid pressure is applied between the dies and the liquid so controlled as to permit a gradual advance of the contracting die to form a neck portion while the liquid pressure is maintained at a point so high as to prevent the collapse or other irregular movement of the metal.

The machine illustrated in Fig. 1 may be described as follows: A hydraulic press is a means for applying pressure between the upper and lower dies. B is the upper platen of the press and C the lower platen which may move upwardly upon vertical rods or guides C'; and D is a usual cylinder whereby the platen C is forced upwardly when water under pressure is admitted into the cylinder D. E is the upper die and E' the upper die head which latter is secured preferably in a removable manner as by a screw $E^2$ to the upper platen B. F is the lower die and F' the lower die head resting upon the lower platen C. The die F may be formed in sections as shown, and there may be a passage below it whereby the sections may when desired be knocked out of place for their removal.

The blank A at its lower part and its bottom fit into the die F and are supported by it. The die E is directly above and is the part which actually accomplishes the contracting or neck forming operation. For this purpose it is formed of suitable metal such as chilled cast iron, and its lower inner edges are rounded so as to facilitate the flow of metal of the blank into the interior cylindrical chamber of the die E when the two dies are forced toward each other.

When the dies are forced together the metal of the blank A at its upper portion will have its original diameter contracted or narrowed to the diameter of the interior chamber of the die E. This operation is difficult and requires due consideration for the possibilities of danger since the metal is liable to contract in some undesirable manner causing buckling or cracking, or it may contract at portions below the portions upon which the contracting die operates. My invention obviates all these difficulties and renders possible what has never been heretofore accomplished.

The operation contemplated by my invention is carried on under a great internal pressure of water or other liquid. As a means for enabling this a heavy ring G is secured into the supporting die head F', the interior diameter of the ring G fitting the exterior diameter of the upper die head E' so that when the dies are forced toward each other the upper die head will slide within the ring G, the latter thereby also acting as a guide. H is a water or liquid pipe which forms part of the means for controlling the liquid filling the interior. Supposing the liquid to be water it will be supplied to the exterior of the cupped-up blank and the upper die E and then the hydraulic pressure upon the platen C may be applied. As the platens approach each other some water must be squeezed out from the exterior of the cupped-up blank and this is controlled by means of a special valve J which is adjustable and is so arranged that the valve opens slightly (as shown in Fig. 2) when the pressure of the water exceeds a given pressure. In this way while water is allowed to escape the interior pressure is maintained at a very high point. This internal liquid pressure co-acts outwardly against both the upper and lower portions of the cupped-up blank in the process or method of forming thereof a pitcher shaped vessel, and in this way the material of the blank is maintained intact and free from buckling, cracks or other defects while at the same time the metal is not attenuated but is maintained of its original thickness throughout the body of the vessel. The action of the contracting die is in the nature of that of an anvil. The enormous pressure between the dies causes the upper rim of the cupped-up blank to pass inward around the rounded edge of the contracting die, the metal thus flowing so as to change the diameter at that portion from the original to a substantially smaller diameter. As the dies approach nearer to each other the rounded edge or shoulder of the contracting die passes further toward the bottom of the vessel and thus forms a contracted neck portion which may be of any desired length depending only upon how far the dies are forced toward each other.

In case water should tend to leak over the upper edge of the cupped-up blank some provision will be desirable to prevent this sort of leakage. This object is accomplished by a compressible annular piece K which forms a sort of packing. This may be formed of rubber. It serves a further important office. The piece K nicely fits the exterior of the blank as seen in Fig. 1. When the dies are approaching each other the piece K is squeezed or compressed and thus flattened out, this at the same time affording a substantial inward pressure against the uncontracted sides of the blank and thereby tends to prevent the excessive interior liquid pressure from actually bulging out the metal of the blank.

I prefer to admit water pressure to the interior of the upper die head and of the blank only when a water tight joint is made by the contracting pressure between the upper die and the blank.

Having thus described a suitable machine for carrying out my method or process and my preferred mode of carrying out the invention and without desiring to limit myself to precise details what I claim and desire to secure by Letters Patent is:

The process of forming seamless hollow ware which consists in first forming a cylindrical cup shaped blank, then reducing the diameter of the blank progressively from its open end towards its closed end, meanwhile maintaining liquid pressure on the inside of the blank, and lateral restraining pressure on the outside of the unreduced portion of the blank, and causing the region of said restraining pressure to move progressively in advance of the reducing pressure.

In testimony whereof, I have signed my name to this specification in the presence of two subscribing witnesses, on this 15th day of June A. D., 1906.

AUGUST GERHARD LINDENBORG.

Witnesses:
GEORGE E. CHAMBERS,
HERBERT O. WOOLLEY.